United States Patent [19]
Stafford et al.

[11] Patent Number: 5,649,721
[45] Date of Patent: Jul. 22, 1997

[54] IMPACT PROTECTION APPARATUS

[75] Inventors: Thomas W. Stafford, Renton; William H. Thode, Enumclaw, both of Wash.

[73] Assignee: The Boeing Co., Seattle, Wash.

[21] Appl. No.: 375,843

[22] Filed: Jan. 20, 1995

[51] Int. Cl.$^6$ ...................................................... B60R 21/04
[52] U.S. Cl. .................... 280/751; 244/118.5; 244/121
[58] Field of Search ................................ 244/118.5, 121; 280/751, 730 A, 743 R, 753; 296/189, 146.6; 420/116, 167

[56] References Cited

U.S. PATENT DOCUMENTS

| | | | |
|---|---|---|---|
| 3,224,924 | 12/1965 | Von Ardenne et al. | 280/751 |
| 3,423,121 | 1/1969 | Lipkin | 244/121 |
| 3,462,330 | 8/1969 | Greig et al. | |
| 3,721,433 | 3/1973 | Sobel | 188/377 |
| 3,834,482 | 9/1974 | Wada et al. | |
| 3,989,275 | 11/1976 | Finch et al. | |
| 4,828,287 | 5/1989 | Siler | 280/751 |
| 4,957,250 | 9/1990 | Tehrani | 244/121 |
| 5,085,382 | 2/1992 | Finkenbeiner | |
| 5,141,279 | 8/1992 | Weller | |
| 5,165,626 | 11/1992 | Ringger et al. | 244/118.5 |
| 5,306,066 | 4/1994 | Saafhoff | 280/751 |
| 5,382,051 | 1/1995 | Glance | 296/189 |
| 5,445,861 | 8/1995 | Newton et al. | 244/121 |
| 5,531,499 | 7/1996 | Vecchio et al. | 188/377 |

FOREIGN PATENT DOCUMENTS 354403  2/1990  European Pat. Off. .

*Primary Examiner*—Galen L. Barefoot
*Attorney, Agent, or Firm*—Lawrence W. Nelson; Daniel T. Anderson

[57] ABSTRACT

The disclosed invention is a bulkhead mounted energy absorbing pad especially useful to protect the head of a passenger seated immediately aft of that bulkhead in a vehicle undergoing a severe frontal crash event. The energy absorbing structure of the pad is a thick panel of low strength aluminum foil honeycomb having its cells aligned essentially with the impact vector. Thin, protective and aesthetic cover sheets and protective edge closeout structure is disclosed.

10 Claims, 3 Drawing Sheets

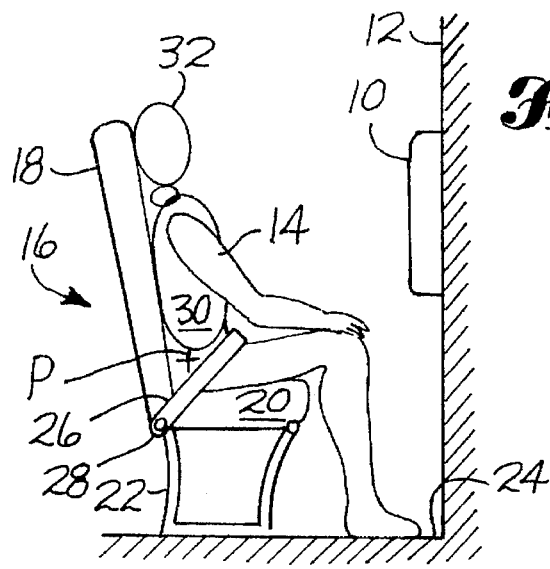
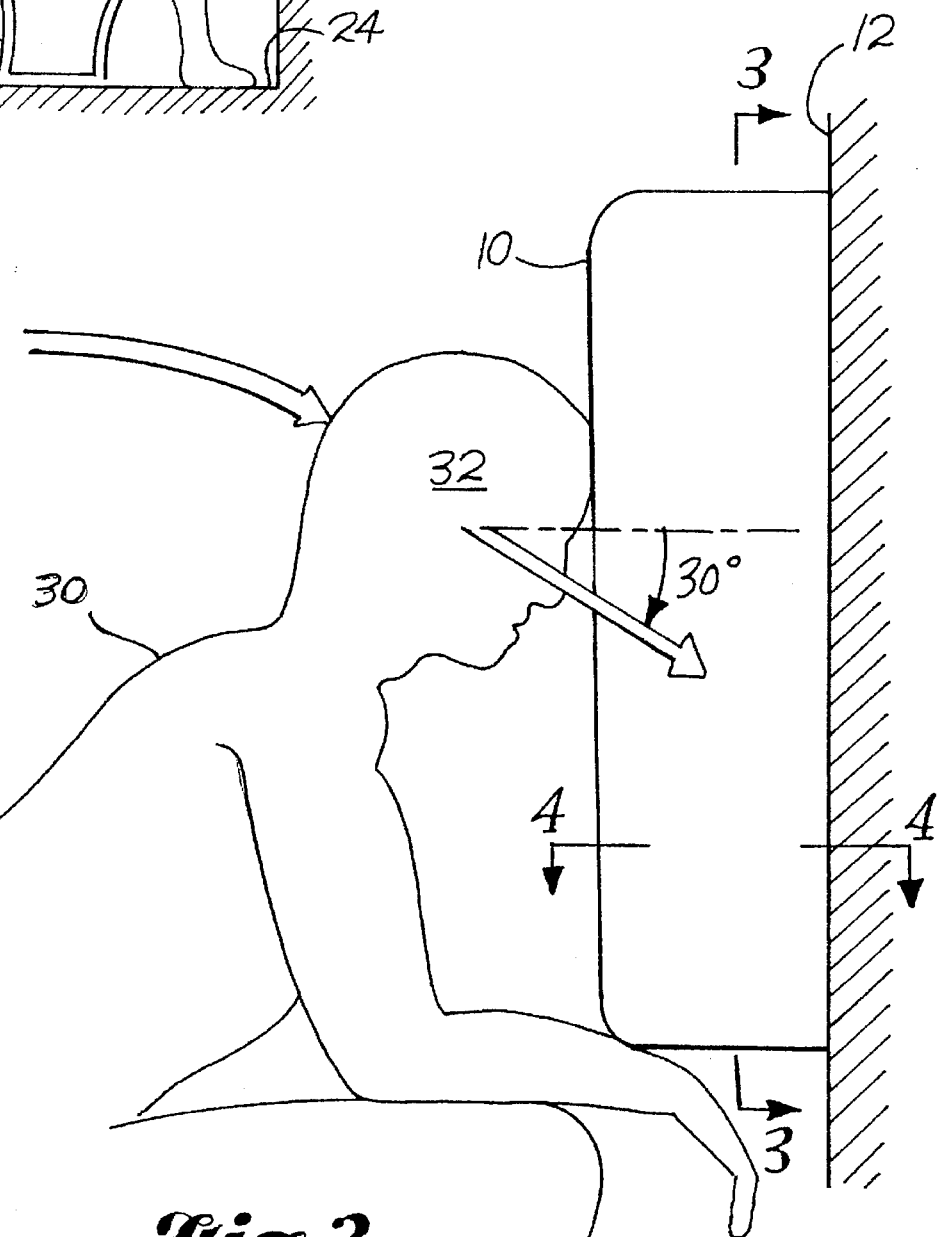

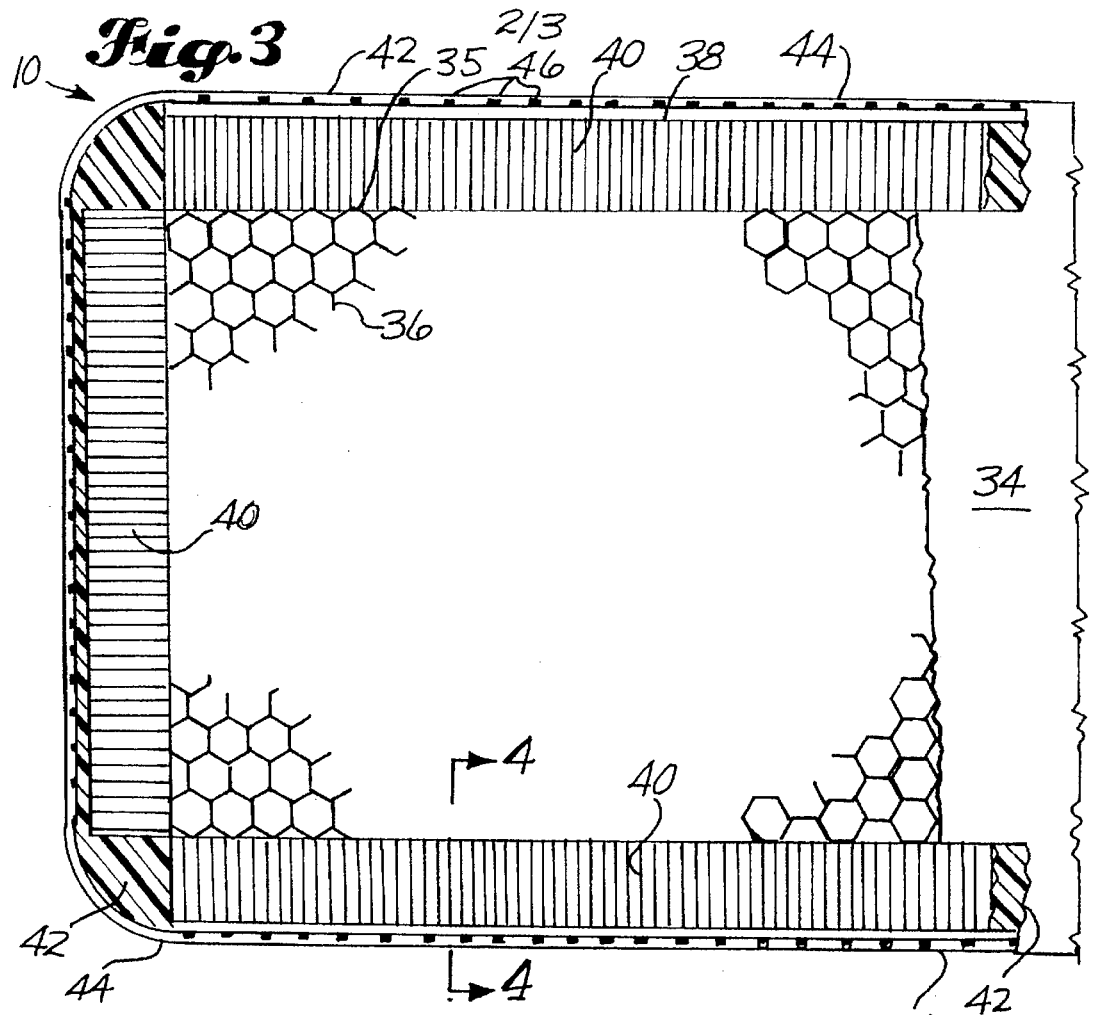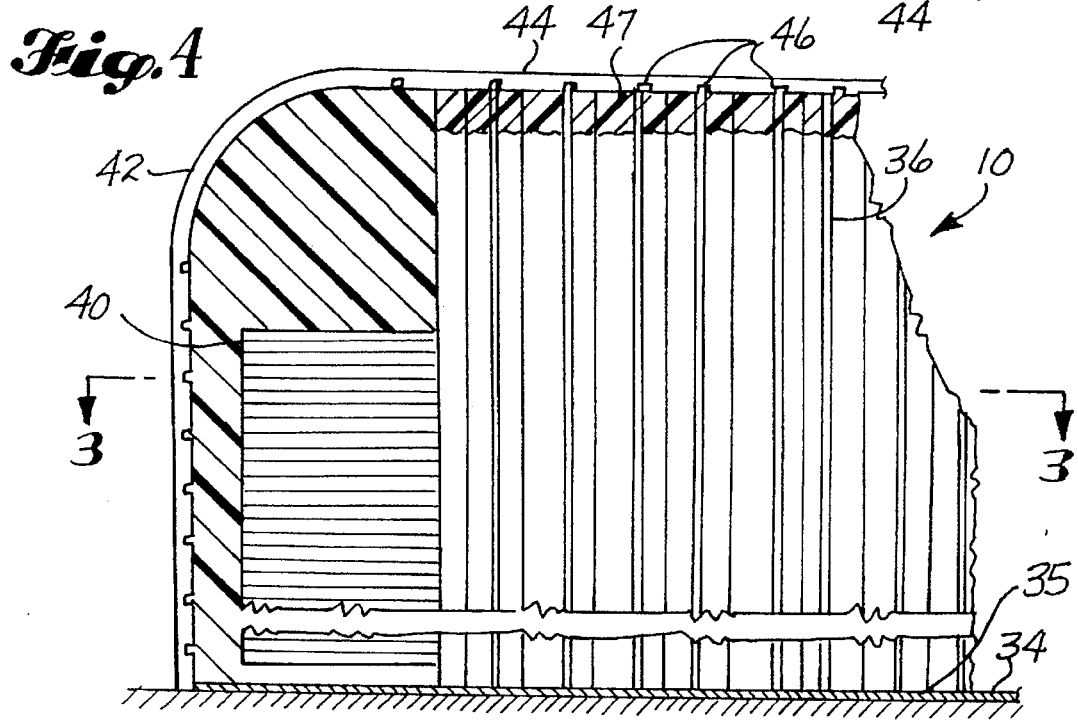

IMPACT PROTECTION APPARATUS

BACKGROUND OF THE INVENTION

This invention relates generally to the field of human body protection during accidental impact with relatively rigid and massive structures and more particularly to an energy absorbing crush apparatus to constantly reduce the magnitude of acceleration (deceleration) suffered by a human body, or a trauma vulnerable portion thereof, during a crash event.

Although the invention finds particularly advantageous utilization in airline passenger, head impact protection applications and although, in the cause of clarity and brevity, much of the discussion below and presentation of examples relates specifically thereto, it is to be understood that the advantages of the invention are equally well manifest in other applications and configurations. For example, the principles described herein are useful in the protection of automobile, train, light airplane, and even cycle passengers from not only frontal head injury, but from frontal, side, or rear impact to such vulnerable body components as spine, torso, and pelvis.

An element of special concern in airplane crash scenarios is protecting the head so that catastrophic brain injury doesn't effectively or actually destroy a life in an otherwise survivable event. The most likely such scenario is a frontal crash with severe abrupt deceleration. The United States Federal Aviation Administration (FAA) has conducted extensive studies dealing with this special concern and has established a quantitative criterion for head injury probability: The head injury criterion (H.I.C.) is set forth as a numerical scale from zero to several thousand with a low number indicating a low probability of severe brain damage and a high number indicating a high probability of serious trauma or death. An event having a H.I.C. value below 1000 is considered to be one in which the probability of severe head injury is acceptably low; and such an event would be considered likely "survivable".

In a particular effort to improve airplane passenger safety and to set a standard considered reasonably achievable, the F.A.A. has mandated in Federal Aviation Regulation (F.A.R.) 25.562 that in a frontal crash in which the airframe undergoes up to a 16 g acceleration, the H.I.C. value for the passenger shall not exceed 1000.

Throughout the passenger seating space, the requirements of F.A.R. 25.562 are readily achievable by straightforward techniques of design and selection of materials with respect to the seating and other equipment and structure with, however, the exception of those seats immediately aft of bulkheads formed by cabin walls, lavatories, class dividers, galleys, or the like. In those seats, although some of the "deceleration" energy is absorbed by the airframe, the seat structure, and its attachment hardware, a passenger's head can be expected to impact the unaltered bulkhead catastrophically. The spacing of the seat backs to the bulkhead is typically about 35 inches; and the H.I.C. value could be made acceptable if the spacing of seat were increased enough to permit the passenger's body to pivot forwardly without head impact to the bulkhead. However, such a solution would require the loss of a row of seats at an effective airline revenue loss of approximately one million dollars per year per seat and would be a cost unacceptable to the passengers and the carrier in view of the extremely low probability of such an accident.

Another suggested solution is to provide mandatory shoulder harness restraints for those seats. Even if acceptable, this would require extensive structural engineering of seats with shoulder harness whose installation behind any bulkhead would reduce flexibility over conventional airplane seats, many of which in modern airplanes are otherwise convertible or moveable. In addition, shoulder harnessed seats cause passenger anxiety as to why some seats have a harness system while others do not.

Rear facing seats has been studied and rejected for many of the same reasons and, in addition, because any rear facing row would require radical modification to airplane interior arrangements.

In like manner, air bags have been extensively studied. This technology has many advantages and has been well developed for the automotive industry; however, the location and character of the crash sensor for a large, high velocity vehicle are unsolved difficult and critical problems. The sensor must reliably detect the initial crash or subsequent secondary impacts and deploy the airbag with extreme precision of timing. An inadvertent deployment could cause serious injury or death. The mechanism depends upon a seriously explosive event with the electrical ignition of powerful pyrotechnics; a situation undesirable in maintaining orderly evacuation from the aircraft. In addition, their maintenance and system reliability checks are complex and costly.

A further approach evidencing promise of providing a solution is an articulating, crash controlled seat pan for those particular bulkhead seats. Such a seat pan rotates and pitches upwardly by gravity and crash acceleration forces whereby the passenger's head is kept from striking the bulkhead. The seat system is complex and costly but can be engineered to fit within the existing seat envelope and provide acceptable H.I.C. values.

Another promising approach has been to develop energy absorbing pads or panels mounted on the bulkhead whereby a passenger's head strikes the pad and suffers an acceptable risk of serious injury. However, heretofore this approach has resulted in pads that 1) were too soft and in which the head would "bottom out" or would suffer such an uneven deceleration as to be ineffective, or 2) were too firm and caused the head to absorb a destructive amount of the kinetic energy, or 3) were too thick or heavy to be acceptable for use in the intended vehicle, or 4) were too elastic and caused dangerous recoil effects.

Accordingly it is an object of the present invention to provide an improved energy absorbing structure for ones body or a vulnerable portion thereof which structure does not suffer the limitations and disadvantages of this and other prior art and which assures H.I.C. values well below 1000 in a 16 g acceleration event.

It is another object to provide such structure which is reliable, durable, stable, low in maintenance or replacement cost, and which is rugged and relatively inexpensive to manufacture and install.

It is another object to provide such apparatus which is aesthetically unobtrusive and which is not susceptible to dents, scratches, or abrasions from exposure to casual events in its normal use environment.

It is another object to provide such structure which is light in weight.

It is another object to provide such apparatus which is totally passive in that it requires no electric or mechanical sensors, no actuators or other moving parts and is not susceptible to any inadvertent enablement or deployment.

SUMMARY OF THE INVENTION

Briefly, these and other objects are achieved in an example of the invention having the overall form of a thick pad made up of a sandwich of a thin, rigid base plate to be fastened to the bulkhead, a thick and low-strength honeycomb section the longitudinal axes of whose cells are perpendicular to the base plate, and a frangible, thin cover sheet having suitably protective and decorative characteristics. The thickness of the honeycomb section, that is, the length of its cells, is typically approximately five inches and its outer face may be filled to a depth of one-quarter inch or more with a lightweight rigid closed cell polyurethane foam to provide overall stability to the structure and an optimum bonding surface for the outer cover sheet.

In applications where the pad protrudes out from the bulkhead, its edges may be finished to form an edge closeout by a sheet of aramid honeycomb bonded over each of the pad's thick edges and having its cells parallel to the base plate. The aramid honeycomb sheet may be approximately one inch thick and may be encased in a shell of medium weight closed cell rigid polyurethane foam for stability and contouring to provide a desired comfortable and aesthetic shape. Again the edge structure may be covered by a thin protective and decorative sheet.

In a presently preferred example of the invention, the cover sheet is polyetherketoneketone (PKK) with an applied decorative laminate. To obviate any diaphragm effect upon impact, the back surface of the PKK sheet may be deeply scored whereby it is thoroughly and readily fractured if impacted by a passenger's head.

DESCRIPTIVE LISTING OF DRAWING FIGURES

FIG. 1 is a schematic representation of a vehicle passenger facing a bulkhead having an energy absorbing pad constructed in accordance with the principles of the invention affixed thereto;

FIG. 2 is an enlarged portion of FIG. 1 illustrating the geometric relationship of the passenger's head just before impact during a frontal crash event;

FIG. 3 is a sectional view of a portion of the energy absorbing pad of FIG. 2 taken along the section reference lines 3—3 thereof;

FIG. 4 is a sectional view of a portion of the energy absorbing pad of FIGS. 2 and 3 taken along the section reference lines 4—4 of each thereof;

DETAILED DESCRIPTION OF PREFERRED EMBODIMENT

Figure 5:
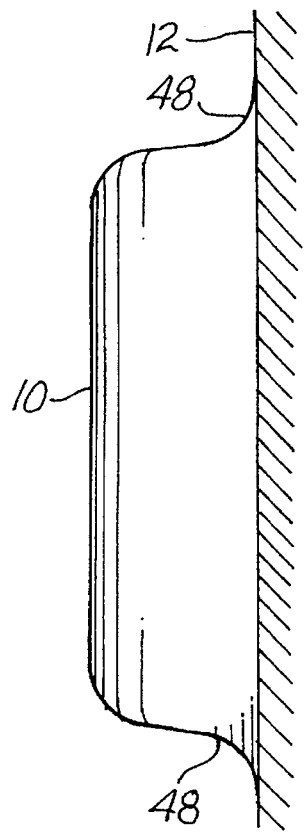
FIG. 5 is a side elevational view of an alternative embodiment of the invention.

In FIG. 1, the example of the invention illustrated is an energy absorbing pad 10 mounted on a bulkhead 12 which may be assumed to be a rigid portion of the frame of the vehicle carrying a passenger 14 shown seated in a conventional seat 16 having a seat back 18 and seat pan 20 and mounted through a base support 22 to the vehicle deck 24. The passenger 14 is shown under a restraint belt 26 affixed to the seat 16 at a pair of supports 28 whereby upon a frontal crash event, the torso 30 with the head 32 of the passenger 14 is propelled and rotated forwardly about a pelvic pivot point indicated at "P".

This motion and displacement of the passenger's torso results, at the instant of contact, in the head 32 impacting the energy absorbing pad 10 in the manner illustrated in FIG. 2. The FAA regulation F.A.R. 25.562 specifies that when the carrier vehicle undergoes a 16 g frontal, horizontal deceleration the H.I.C. value must be less than 1000 when the head 32 is stopped by the bulkhead structure. In addition the regulation specifies a maximum H.I.C. of 1000 for a 30 degree 14 g down load.

Referring to FIG. 3, the section through the main plane of the pad 10 shows that the sandwich of the composite pad includes a base plate 34 which may, for example, be 16 gage aluminum upon which is mounted a thick panel 35 of low crush strength aluminum foil honeycomb 36. In this example, the foil thickness is of the order of a thousandth of an inch formed into cells having a cross section of approximately five-eighths of an inch and a length perpendicular to the base plate 34 of approximately five inches. It is to be noted with importance that all known prior art attempts to utilize the energy absorbing properties of honeycomb crushing structure to comply with F.A.R. 25.562 have oriented the cells perpendicularly to the impact vector and have failed to provide an adequately smooth or constant energy absorption as the subject head progressed through the crushing of the honeycomb material. Accordingly, prior art crushing structures have not achieved H.I.C. values even close to 1000 for 16 g test crashes.

The protective edge closeout for the basic low strength aluminum foil honeycomb is formed in this example by a panel 38 of aramid honeycomb 40 whose cells are approximately one-eighth inch in cross section and one inch long parallel to the base plate 34. The width of the panel of honeycomb may be approximately three and one-half inches and it is, in this example, encased in an envelope 42 of medium weight rigid closed cell polyurethane foam. See also FIG. 4. The width, or vertical height, of the pad 10 may be approximately eighteen inches; and its horizontal length may be selected as appropriate for a single passenger or a row of several passengers. A protective cover for the pad is provided in this example by a sheet 44 of PKK having a thickness of approximately one twenty-fifth of an inch. The cover sheet may include a decorative surface laminate and is preferably deeply scored in its rear surface as indicated by the set of grooves 46 in order to maximize its frangibility upon impact and thereby eliminate any elastic, diaphragm effect it might otherwise exhibit. To provide stability and durability from inadvertent impacts and to provide a continuous surface for bonding the PKK sheet 44 to the body of the low strength honeycomb 36, a layer 47 of lightweight rigid, closed cell polyurethane foam is shown embedded, in this example, into the honeycomb cells 36 from their front surface to a depth of one-eighth inch to one-quarter inch depending upon the desired specific chosen configuration. It may be noted, however, that the frangibility of the PKK sheet may be further enhanced by bonding it to the composite body of the pad over only its peripheral portions.

Protective pads constructed as thusly described have repeatedly provided H.I.C. values of less than 650 in realistic tests using highly sophisticated and precisely instrumented equipment and a 50 percentile male anthropomorphic test dummy.

In FIG. 5 an example of the energy absorbing pad 10 is illustrated in which the edge closeout material enclosed in the envelope 42 is provided with contoured edges 48 to form an aesthetically improved juncture with the bulkhead 12 upon which it is supported by conventional means not shown.

Figure 6:
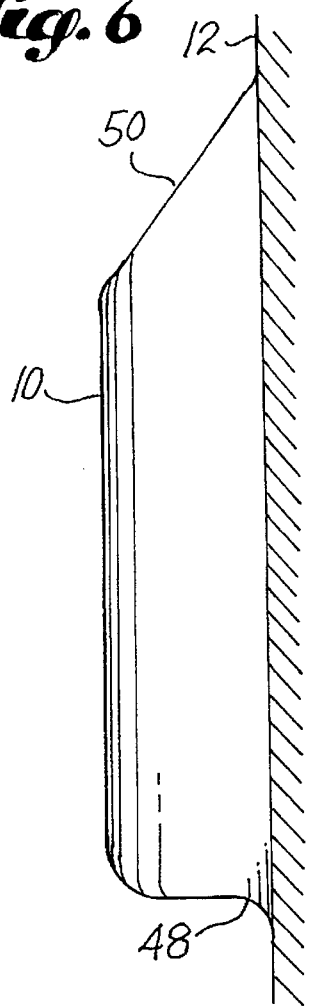
FIG. 6 is a similar view a further example of the invention.

FIG. 6 illustrates a similar embodiment of the novel pad 10 in which its upper edge 50 is sloped at an angle of approximately 45° for aesthetic purposes and to preclude an undesired shelf effect for the structure.

Figure 7:
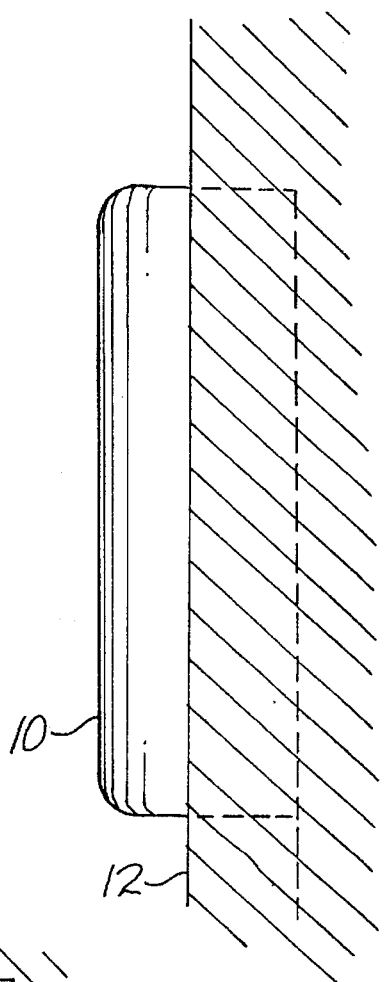
FIG. 7 is a similar view indication an embodiment of invention in which the energy absorbing pad is partially embedded in the bulkhead.

FIG. 7 illustrates an installation of the invention in which its advantages are achieved in a reduced profile. The pad 10 is partially embedded in the bulkhead, again, by conventional methods whereby its intrusion into the passenger space is significantly reduced.

Figure 8:
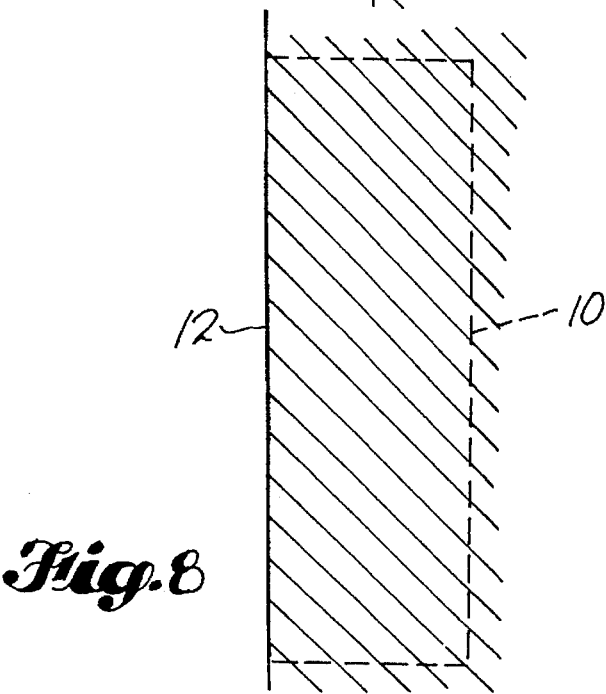
FIG. 8 is a similar view in which the energy absorbing pad of the invention is fully embedded within the supporting bulkhead.

In FIG. 8 it is shown that in some applications, the novel pad 10 may be fully embedded in the bulkhead. With respect to the embodiments of FIGS. 7 and 8 it may be noted that when it is desired thusly to reduce the effective profile of the pad, the degree of its insertion into the bulkhead may be determined by the character and thickness of the bulkhead.

There have thus been disclosed and described a number of examples and embodiments of an energy absorbing pad to protect the human body and which achieves the objects enumerated and exhibits the advantages discussed above. The disclosed structure has broad application; and equivalents and the inventors' rights thereto are to be limited only by the scope of the following claims.

What is claimed is:

1. Body impact protection apparatus of the character to be carried within a vehicle for the protection of trauma vulnerable portions of human passengers therein, the apparatus being a thick pad comprising a sandwich of:

a thin base plate attachable to the structure of the vehicle forwardly of the head of the passenger;

a thick, low strength honeycomb slab having a first face affixed to said base plate and the longitudinal axes of whose cells are perpendicular to said base plate; and a rigid frangible, thin cover sheet having a pattern scored over its inner surface to maximize its frangibility on impact, said cover sheet being affixed over a second face of said honeycomb slab.

2. The invention as set forth in claim 1 in which each of the cells of said honeycomb slab are fabricated of light weight metal foil of the order of 0.001 inches in thickness.

3. The invention as set forth in claim 2 in which said cells are approximately five inches long and have a width of approximately five-eighths inch.

4. The invention as set forth in claim 2 which further includes a layer of lightweight rigid foam disposed across said second face of said slab contiguous to said cover sheet and imbedded to a shallow depth into the ends of said cells.

5. The invention as set forth in claim 2 which further includes a protective edge closeout honeycomb panel affixed over the edge of said slab and having cells parallel to said base plate.

6. The invention as set forth in claim 5 in which said closeout honeycomb panel is composed of aramid material and has cell geometry of approximately one inch by one-eighth inch.

7. The invention as set forth in claim 1 in which said cover sheet is polyetherketoneketone having a sheet thickness of approximately one twenty-fifth inches.

8. The invention as set forth in claim 7 in which said cover sheet is bonded to said slab along only its peripheral portions.

9. The invention as set forth in claim 1 in which said face plate is sheet aluminum.

10. Body impact protection apparatus of the character to be carried within a vehicle for the protection of trauma vulnerable portions of human passengers therein, the apparatus being a thick pad comprising a sandwich of:

a thin base plate attachable to the structure of the vehicle forwardly of the head of the passenger;

a thick, low strength honeycomb slab having a first face affixed to said base plate and the longitudinal axes of whose cells are perpendicular to said base plate;

a rigid frangible, thin cover sheet affixed over a second face of said honeycomb slab; and a layer of lightweight rigid foam disposed across said second face of said slab contiguous to said cover sheet and imbedded to a shallow depth into the ends of said cells.

* * * * *